INVENTORS.
Richard E. Wing
Benjamin G. Hofmeyer
BY Griswold & Burdick
ATTORNEYS

United States Patent Office 2,991,188
Patented July 4, 1961

2,991,188
SPRAY COATING METHOD AND COATED SPRAY BOOTH
Richard E. Wing, Midland, and Benjamin G. Hofmeyer, Bay City, Mich., assignors to The Dow Chemical Company, Midland, Mich., a corporation of Delaware
Filed May 21, 1958, Ser. No. 736,708
4 Claims. (Cl. 117—5.5)

This invention relates to a masking composition, processes using said composition, and paint spray booths having surfaces masked by a coating of said composition.

In many coating processes wherein a permanent coating material, such as paint, varnish, lacquer, enamel, latex or the like (hereinafter referred to, broadly, as paint) is sprayed onto a surface to be coated, the sprayed material also coats the walls of the spray booth and other exposed surfaces and areas on which a coating is not desired. It is then necessary to remove this undesired coating. When done by methods heretofore known, this is a tedious and expensive operation.

An object of this invention is to provide spray-paint booths the surfaces of which are easily cleaned. Another object is to provide processes for spray-painting restricted surfaces while protecting exposed surfaces not to be painted by applying to the latter surfaces a low-melting, water-soluble masking coating.

According to the invention, the water-soluble, low-melting, solid polyoxyalkylene compounds; i.e., glycols and the ethers and esters thereof, are particularly desirable as the major or sole component of improved masking compositions. Such compositions are easily applied to surfaces to be masked by brushing, spraying or dipping techniques using either the polyoxyalkylene compound per se or a solution thereof in a suitable solvent, such as water. The thickness of the coating of masking composition is not important so long as substantially complete coverage is achieved. However, the ease of removal is somewhat increased with thicker films up to a thickness of the order of about 0.01 inch; beyond that there is little if any advantage in greater thickness. In the interest of economy, it is usually preferred to apply films of the order of 0.001 to 0.01 inch thickness.

The thickness of the masking film is easily regulated by the application of an aqueous solution of the masking composition of suitable concentration. A concentrated solution has a relatively high viscosity and readily yields thicker films while dilute solutions are quite fluid and readily drain away to leave only a thin film. The molecular weight of the polyoxyalkylene compound has a similar influence on viscosity and film thickness.

Figure 1:
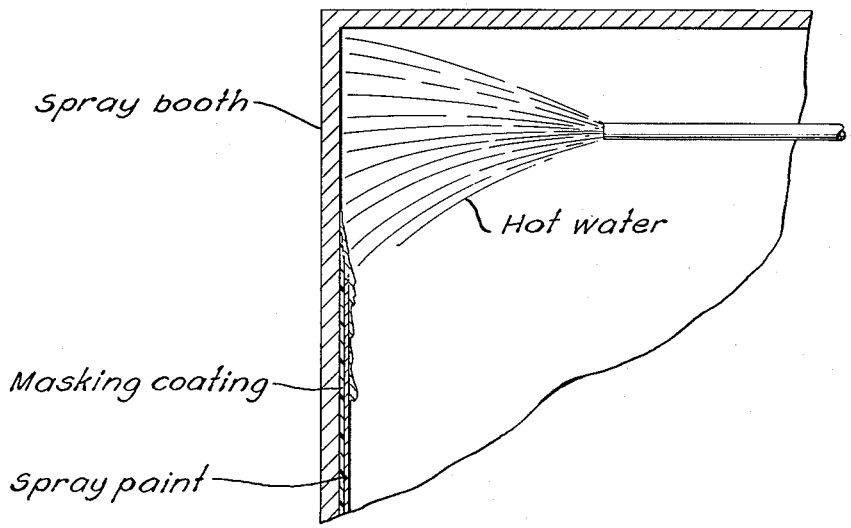

FIGURE 1 is a section through a conventional spray-paint booth, the wall of which has been coated with the masking composition of the invention. The masking coating is in turn coated with spray paint accumulated through normal use of the booth. The figure shows removal of both the masking coating and the spray paint accumulation by flushing the wall with hot water.

Figure 2:
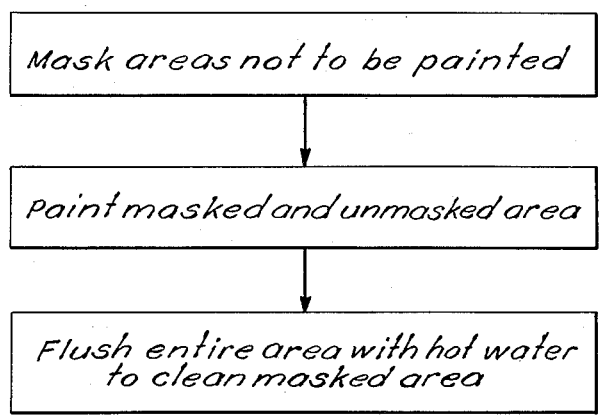

FIGURE 2 is a flow sheet showing the essential steps in practicing the process of the invention; i.e., areas not to be painted but adjacent to areas that are to be painted are masked by application of the masking composition of the invention, the areas to be painted are then painted without regard to whether masked areas are also painted, and finally, the masking composition and any paint thereon are flushed from the masked areas by application of hot water.

The polyoxyalkylene compounds suitable for use in practicing the invention are, in general, those that have melting points above normal room temperature; i.e., above about 20° C., and that are appreciably water-soluble or are self-dispersible in water. The term "water-soluble" as used herein means that the substance readily disperses in water, either as a true solution or a colloidal dispersion. As a practical matter, such compounds usually contain a major proportion, i.e., at least about 50% by weight, of oxyethylene units in the polyoxyalkylene chains. The preferred compounds contain at least about 80% of oxyethylene units; polyoxyethylene glycol itself (100% oxyethylene units) being an especially preferred species. Other polyoxyalkylene compounds having the desired properties include the polyglycols containing oxypropylene, 3-chloro-1,2-oxypropylene or oxybutylene units and the ethers and esters thereof, provided the molecular units other than oxyethylene units are not present in sufficient amounts to either lower the melting point below about 20° C. or render the compound insoluble in water. When oxyalkylene units other than oxyethylene units are present in the molecules of the polyoxyalkylene compounds, it is preferred, though not essential, that they be segregated as in a block polymer. Thus, for example, the solid, water-soluble block polymers made as described in U.S. Patents 2,831,034, 2,828,345, 2,677,700 and 2,674,619 are preferred to the corresponding heteric polymers, i.e., those in which the polyoxyalkylene chains are made up of a random sequence of the various oxyalkylene units.

The practice of the invention is illustrated by the following examples.

Example 1

Polyethylene glycol of average molecular weight about 4000 and having a melting point of about 55° C. was melted and diluted with water to form a 65% solution. A surfactant (sodium alkyldiphenyl oxide sulfonate) was added in 0.05% concentration to aid in uniform wetting and spreading of the solution. The formulation was then sprayed on a sheet-metal surface to form a film of about 16 g./ft.$^2$ (dry basis). The water quickly evaporated to leave a smooth, dry, uniform coating. Paint was then sprayed over the surface and allowed to dry for 24 hours. Water at about 100° C. was then sprayed on the painted surface. The masking coat of polyglycol quickly melted and the stream of hot water broke the paint film and quickly flushed away both the paint and the masking composition, leaving a clean metal surface.

Example 2

A masking composition similar to that of Example 1 except that it contained about 5% of titanium dioxide was prepared and used as described in Example 1. It had the advantage that coated areas were colored white, and thus were readily distinguished from uncoated areas; otherwise it functioned substantially the same as that of Example 1.

Example 3

A masking composition was prepared having the formula (percentages are by weight):

| | Percent |
|---|---|
| Polyethylene glycol of mol. wt. 4000 | 31 |
| Polyethylene glycol of mol. wt. 2000 | 33 |
| Titanium dioxide | 4.65 |
| Sodium hexametaphosphate | .25 |
| Sodium alkyldiphenyl oxide sulfonate | .10 |
| Water | 31 |

The above composition was used as a masking agent as described in Example 1 and found to give results similar to that of Example 2 except that the masking coating was somewhat softer, less brittle and more quickly dissolved by hot water.

Results similar to those described above are obtained when other solid, water-soluble polyglycols or their ethers or esters are used instead of the polyethylene glycols used above. Likewise, other pigments, dyes, fillers, surfactants and surfactant builders may be used within the scope of the invention.

The higher polyethylene glycols are hard, brittle solids and in some cases it is desirable to soften them and reduce their brittleness by the incorporation of a plasticizer or softener. Suitable softeners, which may be used in amounts of about 5–25% by weight, include glycerol, glycol, the alkylene glycol ethers and the liquid polyglycols and their ethers and esters.

The masking compositions of the present invention are particularly useful for coating the walls and exposed surfaces in paint spray booths. Another highly advantageous use is in the painting of multicolored items wherein all areas except those of a single color are masked while that color is being applied. This is repeated for each color until all colors have been applied.

While water is the preferred solvent, for special purposes other solvents may be used. Thus, for a very quick-setting composition, a portion of the water in the formulation may be replaced with methanol. Similarly, if it is desired to increase the drying time, other solvents, compatible with the system which have a slower evaporation rate than water, may be added to the aqueous solutions. Alternatively, the pure masking composition is melt-sprayed on the surfaces to be masked, thus dispensing altogether with solvents and achieving the shortest possible drying or setting time.

We claim:

1. In a process in which a coating material is sprayed onto a surface to be coated, the step of masking an exposed surface area which is not to be coated by applying thereto a continuous film of a masking composition comprising a water-soluble polyoxyalkylene compound having a melting point of about 25–90° C., spray-coating the first said surface and removing both the spray-coat and the masking composition from the masked surface area by melting said film of masking composition and mechanically removing the thus loosened film and coating.

2. A process as defined in claim 1 wherein the spray-coat and the masking composition are removed from the masked surface area by flushing said area with water having a temperature above the melting point of the film of masking composition.

3. In the process wherein an object is spray-painted in a spray-paint booth while the walls of said booth are coated with a masking composition which is periodically removed and renewed, the improvement comprising coating the walls of said booth with a masking composition comprising a water-soluble polyoxyalkylene compound having a melting point of about 20° to 90° C.

4. A spray-paint booth wherein the surfaces exposed to paint spray are coated with a masking composition comprising a water-soluble polyoxyalkylene compound having a melting point of about 20 to 90° C.

References Cited in the file of this patent

UNITED STATES PATENTS

| | | |
|---|---|---|
| 1,747,661 | Carter | Feb. 18, 1930 |
| 1,862,392 | Affleck et al. | June 7, 1932 |
| 2,563,499 | Smith | Aug. 7, 1951 |
| 2,603,574 | Holmes | July 15, 1952 |

OTHER REFERENCES

"Carbowax" Compounds and Polyethylene Glycols, Carbide and Carbon Chemicals Corp., 1946.